US007815818B2

(12) United States Patent
Hsu et al.

(10) Patent No.: US 7,815,818 B2
(45) Date of Patent: Oct. 19, 2010

(54) METHOD FOR AMELIORATING THE WIDE COLUMN GAP DEFECT IN ORGANIC ELECTRONIC DEVICES (75) Inventors: Che-Hsiung Hsu, Wilmington, DE (US); Ed Sundaram Ramakrishnan, San Jose, CA (US); Dmitry Kolosov, Goleta, CA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/486,908

(22) Filed: Jun. 18, 2009

(65) Prior Publication Data
US 2009/0250665 A1 Oct. 8, 2009

Related U.S. Application Data (62) Division of application No. 11/321,813, filed on Dec. 29, 2005, now Pat. No. 7,563,392.

(60) Provisional application No. 60/640,782, filed on Dec. 30, 2004, provisional application No. 60/694,392, filed on Jun. 27, 2005.

(51) Int. Cl.
*H01B 1/00* (2006.01)
(52) U.S. Cl. .................... 252/500; 257/40; 438/99; 430/529
(58) Field of Classification Search ................. 250/500; 257/40; 438/99; 430/529
See application file for complete search history.

(56) References Cited
U.S. PATENT DOCUMENTS

| 4,321,114 | A |   | 3/1982  | MacDiarmid et al. |
| 4,356,429 | A |   | 10/1982 | Tang |
| 4,539,507 | A |   | 9/1985  | VanSlyke et al. |
| 4,711,742 | A |   | 12/1987 | Jen et al. |
| 4,738,757 | A | * | 4/1988  | Naarmann ............. 205/152 |
| 5,247,190 | A |   | 9/1993  | Friend et al. |
| 5,300,575 | A |   | 4/1994  | Jonas et al. |
| 5,317,169 | A |   | 5/1994  | Nakano et al. |
| 5,408,109 | A |   | 4/1995  | Heeger et al. |
| 5,798,170 | A |   | 8/1998  | Zhang et al. |
| 6,132,644 | A |   | 10/2000 | Angelopoulos et al. |
| 6,157,113 | A |   | 12/2000 | Hunter et al. |
| 6,303,238 | B1 |  | 10/2001 | Thompson et al. |
| 6,685,853 | B1 | * | 2/2004 | Angelopoulos et al. ..... 252/500 |
| 6,806,349 | B2 |  | 10/2004 | Angelopoulos et al. |
| 6,913,944 | B2 | * | 7/2005 | Hirai .................... 438/99 |
| 7,053,174 | B2 |  | 5/2006  | Kirchmeyer et al. |
| 7,056,600 | B2 |  | 6/2006  | Andriessen |

(Continued)

FOREIGN PATENT DOCUMENTS

EP        1 191 612 A2    3/2002

(Continued)

OTHER PUBLICATIONS

Campbell et al., "Excitation Transfer Processes in a Phosphor-Doped Poly(p-Phenylene Vinylene) Light-Emitting Diode", Physical Review B. Condensed matter and materials physics, Feb. 8, 2002, 65(8), 085210.1-085210.8.

(Continued)

*Primary Examiner*—Mark Kopec
*Assistant Examiner*—Khanh Tuan Nguyen
(74) *Attorney, Agent, or Firm*—Woodcock Washburn LLP (57) ABSTRACT Compositions comprising at least one conductive polymer and an organic cation are provided, and methods for making the same.

13 Claims, 1 Drawing Sheet

U.S. PATENT DOCUMENTS

| | | | |
|---|---|---|---|
| 7,189,991 B2 * | 3/2007 | Yu et al. | 257/40 |
| 7,431,866 B2 * | 10/2008 | Hsu et al. | 252/500 |
| 7,563,392 B1 * | 7/2009 | Hsu et al. | 252/500 |
| 2001/0016303 A1 * | 8/2001 | Majumdar et al. | 430/529 |
| 2001/0019782 A1 | 9/2001 | Igarashi et al. | |
| 2001/0022497 A1 * | 9/2001 | Aoki et al. | 313/507 |
| 2002/0179900 A1 * | 12/2002 | Buechel et al. | 257/40 |
| 2003/0062510 A1 * | 4/2003 | Van den Bogaert | 252/500 |
| 2004/0127637 A1 | 7/2004 | Hsu et al. | |
| 2004/0164939 A1 | 8/2004 | Johnson et al. | |
| 2006/0076557 A1 | 4/2006 | Waller | |
| 2006/0138401 A1 * | 6/2006 | Yu et al. | 257/40 |
| 2006/0261314 A1 * | 11/2006 | Lang et al. | 252/500 |
| 2009/0250665 A1 * | 10/2009 | Hsu et al. | 252/500 |

FOREIGN PATENT DOCUMENTS

| | | |
|---|---|---|
| EP | 1 191 614 A2 | 3/2002 |
| JP | 05-262981 * | 10/1993 |
| WO | WO 00/70655 A2 | 11/2000 |
| WO | WO 01/41512 A1 | 6/2001 |
| WO | WO 02/02714 A2 | 1/2002 |
| WO | WO 02/15645 A1 | 2/2002 |
| WO | WO 02/065484 | 8/2002 |

OTHER PUBLICATIONS

Gustafsson et al., "Flexible Light-Emitting Diodes made from Soluble Conducing Polymer", Nature, Jun. 11, 1992, 357, 477-479.

Markus, J, "Electronics and nucleonics dictionary;: Accurate, easy-to-understand, and up-to-date definitions for 16,338 terms used in television, radio, medical electronics, . . . nuclear science, and nuclear engineering", McGraw-Hill, 3rd edition, 1966, 470 and 476.

O'Brien et al., "Electrophosphoresence from a doped polymer light emitting diode", Synthetic Metals, Jan. 1, 2001,116(1-3), 379-383.

Othmer, Is., Kirk-Othmer Encyclopedia of Chemical Technology, "Paper to Pigment Dispersions" Mar. 1, 1996, vol. 18, 4th ed., 837-860.

* cited by examiner

FIG. 1

METHOD FOR AMELIORATING THE WIDE COLUMN GAP DEFECT IN ORGANIC ELECTRONIC DEVICES

CROSS REFERENCE

This application is a divisional application of U.S. patent application Ser. No. 11/321,813, filed Dec. 29, 2005, which claims benefit to U.S. Provisional Application Ser. Nos. 60/640,782, filed Dec. 30, 2004 and 60/694,392, filed Jun. 27, 2005. The content of the above-referenced patent applications is herein incorporated by reference in its entirety.

FIELD

This disclosure relates generally to organic electronic devices, and materials and methods for fabrication of the same.

BACKGROUND

Organic electronic devices convert electrical energy into radiation, detect signals through electronic processes, convert radiation into electrical energy, or include one or more organic semiconductor layers. Organic electronic devices include at least one active layer comprising photoactive compositions. Such devices often include buffer layers. Buffer layers often include an electrically conducting polymer and typically facilitate the injection of holes from the anode into the photoactive layer.

It is an important goal in the industry to develop improved buffer layer compositions.

SUMMARY

Compositions comprising at least one conductive polymer and an organic cation are provided, and methods for making the same, as well as devices and sub-assemblies including the same.

The foregoing general description and the following detailed description are exemplary and explanatory only and are not restrictive of the invention, as defined in the appended claims.

BRIEF DESCRIPTION OF THE DRAWINGS

Embodiments are illustrated in the accompanying figures to improve understanding of concepts as presented herein.

The figures are provided by way of example and are not intended to limit the invention. Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

In one embodiment, compositions are provided comprising at least one conductive polymer and an organic cation.

In one embodiment, compositions are provided comprising at least one conductive polymer and an organic cation derived from a phosphate or hydroxide salt.

In one embodiment, compositions are provided comprising at least one conductive polymer, a water soluble polymeric acid, and an organic cation derived from a phosphate or hydroxide salt.

In one embodiment, compositions are provided comprising at least one conductive polymer, a water soluble polymeric acid, and an organic cation derived from a salt comprising tetraalkyl ammonium phosphate, tetraalkyl ammonium hydroxide, diallyl dimethyl ammonium phosphate, diallyl dimethyl ammonium hydroxide, or mixtures thereof.

Conductive Polymers

As used herein, the term "electrically conductive polymer" refers to any polymer or oligomer which is inherently or intrinsically capable of electrical conductivity without the addition of carbon black or conductive metal particles. In some embodiments, the electrically conductive polymer is conductive in a protonated form and not conductive in an unprotonated form. The term "polymer" encompasses homopolymers and copolymers. The term "electrical conductivity" includes conductive and semi-conductive. In one embodiment, films made from the electrically conductive polymer have a conductivity of at least $10^{-7}$ S/cm. In one embodiment, a conductive material has a bulk conductivity greater than approximately $10^{-6}$ S(Siemens=1/ohm)/.

The conductive polymers can be chosen from any conductive polymer suitable for use in an organic electronic device. In one embodiment, the conductive polymers are polythiophenes, polypyrroles, polyanilines, polyamines, polyacetylenes, poly(thienothiophenes), or poly(3,4-ethylenedioxythiophenes), or combinations thereof.

The conductive polymers can be homopolymers or they can be random, block, graft, or alternating copolymers.

In one embodiment, the conductive polymer is selected from polythiophenes, or polypyrroles, or polyanilines, or combinations thereof.

Polythiophenes contemplated for use in the new compositions comprise Formula I below:

(I)

wherein:

R' is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, amidosulfonate, ether carboxylate, ether sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms, and n is at least about 4.

In some embodiments, the polythiophenes are poly (thienothiophenes).

As used herein, the term "alkyl" refers to a group derived from an aliphatic hydrocarbon and includes linear, branched and cyclic groups which may be unsubstituted or substituted. The term "heteroalkyl" is intended to mean an alkyl group, wherein one or more of the carbon atoms within the alkyl group has been replaced by another atom, such as nitrogen, oxygen, sulfur, and the like. The term "alkylene" refers to an alkyl group having two points of attachment.

As used herein, the term "alkenyl" refers to a group derived from an aliphatic hydrocarbon having at least one carbon-carbon double bond, and includes linear, branched and cyclic groups which may be unsubstituted or substituted. The term "heteroalkenyl" is intended to mean an alkenyl group, wherein one or more of the carbon atoms within the alkenyl group has been replaced by a heteroatom, such as nitrogen, oxygen, sulfur, and the like. The term "alkenylene" refers to an alkenyl group having two points of attachment.

Any of the above groups may further be unsubstituted or substituted, and any group may have fluorine substituted for one or more hydrogens, including perfluorinated groups.

In one embodiment, in the polythiophene both $R^1$ together form —O—$(CHY)_m$—O—, where m is 2 or 3, and Y is the same or different at each occurrence and is selected from hydrogen, alkyl, alcohol, amidosulfonate, benzyl, carboxylate, ether, ether carboxylate, amidosulfonate, ether sulfonate, and urethane. In one embodiment, all Y are hydrogen. In one embodiment, the polythiophene is poly(3,4-ethylenedioxythiophene). In one embodiment, at least one Y group is not hydrogen. In one embodiment, at least one Y group is a substituent having fluorine substituted for at least one hydrogen. In one embodiment, at least one Y group is perfluorinated.

Polypyrroles contemplated for use in the new compositions comprise Formula II below.

(II)

wherein
p is at least about 4;
$R^{10}$ is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, and urethane; or both $R^{10}$ groups together may form an alkylene or alkenylene chain completing a 3, 4, 5, 6, or 7-membered aromatic or alicyclic ring, which ring may optionally include one or more divalent nitrogen, sulfur or oxygen atoms; and $R^{11}$ is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, benzyl, carboxylate, ether, amidosulfonate, ether carboxylate, ether sulfonate, and urethane.

In one embodiment, $R^{10}$ is the same or different at each occurrence and is independently selected from hydrogen, alkyl, alkenyl, alkoxy, cycloalkyl, cycloalkenyl, alcohol, benzyl, carboxylate, ether, amidosulfonate, ether carboxylate, ether sulfonate, urethane, epoxy, silane, siloxane, and alkyl substituted with one or more of sulfonic acid, carboxylic acid, acrylic acid, phosphoric acid, phosphonic acid, halogen, nitro, cyano, hydroxyl, epoxy, silane, or siloxane moieties.

In one embodiment, $R^{11}$ is selected from hydrogen, alkyl, and alkyl substituted with one or more of sulfonic acid, carboxylic acid, acrylic acid, phosphoric acid, phosphonic acid, halogen, cyano, hydroxyl, epoxy, silane, or siloxane moieties.

In one embodiment, the polypyrrole is unsubstituted and both $R^{10}$ and $R^{11}$ are hydrogen.

In one embodiment, both $R^{10}$ together form a 6- or 7-membered alicyclic ring, which is further substituted with a group selected from alkyl, heteroalkyl, alcohol, benzyl, carboxylate, ether, ether carboxylate, amidosulfonate, ether sulfonate, and urethane. These groups can improve the solubility of the monomer and the resulting polymer. In one embodiment, both $R^{10}$ together form a 6- or 7-membered alicyclic ring, which is further substituted with an alkyl group. In one embodiment, both $R^{10}$ together form a 6- or 7-membered alicyclic ring, which is further substituted with an alkyl group having at least 1 carbon atom.

In one embodiment, both $R^{10}$ together form —O—$(CHY)_m$—O—, where m is 2 or 3, and Y is the same or different at each occurrence and is selected from hydrogen, alkyl, alcohol, benzyl, carboxylate, ether, ether carboxylate, amidosulfonate, ether sulfonate, and urethane. In one embodiment, at least one Y group is not hydrogen. In one embodiment, at least one Y group is a substituent having fluorine substituted for at least one hydrogen. In one embodiment, at least one Y group is perfluorinated.

Polyanilines contemplated for use in the new compositions comprise Formula III or Formula IV below.

wherein:
t is at least about 4;
q is an integer from 0 to 4;
r is an integer from 1 to 5, with the proviso that q+r=5; and
$R^{12}$ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two $R^{12}$ groups together may form an alkylene or alkenylene chain completing a 3, 4, 5, 6, or 7-membered aromatic or alicyclic ring, which ring may optionally include one or more divalent nitrogen, sulfur or oxygen atoms.

In one embodiment, the polyaniline is unsubstituted and q=0.

The synthesis of thiophene, thienothiophene, pyrrole, and aniline polymers is well known and has been extensively described. Polymerization of thiophene monomers has been described in, for example, U.S. Pat. No. 5,300,575. Polymerization of aniline monomers has been described in, for example, U.S. Pat. No. 5,798,170.

In one embodiment, the conducting polymer is polyaniline ("PAni"), polypyrrole (PPy), or poly(3,4-ethylenedioxythiophene) ("PEDT" or "PEDOT").

In one embodiment, the conductive polymers are poly(3,4-ethylenedioxythiophenes).

Water Soluble Polymeric Acids

In one embodiment, the compositions further comprise water soluble polymeric acids.

In one embodiment, the conductive polymers are made by oxidative polymerization of the monomer or monomers to form the conductive polymer, in the presence of a soluble acid. The acid can be a polymeric or non-polymeric acid. The polymerization is generally carried out in a homogeneous solution. In one embodiment, the polymerization is carried out in a homogeneous aqueous solution. In another embodiment, the polymerization for obtaining the electrically conducting polymer is carried out in an emulsion of water and an organic solvent. In general, some water is present in order to obtain adequate solubility of the oxidizing agent and/or catalyst. Oxidizing agents such as ammonium persulfate, sodium persulfate, potassium persulfate, and the like, can be used. A catalyst, such as ferric chloride, or ferric sulfate may also be present. The resulting polymerized product will be a solution, dispersion, or emulsion of the doped conductive polymer. Aqueous dispersions of polypyrrole and a non-polymeric organic acid anion are available commercially from Sigma-Aldrich (St. Louis, Mo.). Aqueous dispersions of poly(2,3-ethylendioxythiophene)/PSSA are available commercially from H.C. Starck, GmbH. (Leverkusen, Germany). Aqueous dispersions of doped polyaniline are available commercially from Covion Organic Semiconductors GmbH (Frankfurt, Germany) or Ormecon (Ambersbek, Germany).

Examples of polymeric organic acids include, but are not limited to, poly(styrenesulfonic acid) (PSSA), and poly(2-acrylamido-2-methyl-1-propanesulfonic acid) ("PAAMPSA"). The corresponding acid anions are the sulfonates, "PSS" and "PAAMPS". Examples of suitable non-polymeric acids include, but are not limited to, acetic acid, p-toluenesulfonic acid, camphorsulfonic acid, p-dodecylbenzenesulfonic acid, methanesulfonic acid, trifluoromethanesulfonic acid, and the like. The corresponding acid anions are acetate, p-toluenesulfonate, camphorsulfonate, p-dodecylbenzenesulfonate, methanesulfonate, and trifluoromethanesulfonate. Mixtures of acid anions can be used.

In one embodiment, the conducting polymer is polyaniline ("PAni"), polypyrrole (PPy), or poly(3,4-ethylenedioxythiophene) ("PEDT" or "PEDOT"), prepared by polymerizing the appropriate monomers in aqueous solution in the presence of a water soluble polymeric acid, such as poly(styrenesulfonic acid) (PSSA), or poly(2-acrylamido-2-methyl-1-propanesulfonic acid) ("PAAMPSA"), as described in, for example, U.S. Pat. No. 5,300,575 and published PCT application WO 02/065484. In one embodiment, the water soluble polymeric acids are poly(styrenesulfonic acids). In one embodiment, the conducting polymer and water soluble polymeric acid are Poly(3,4-ethylenedioxythiophene)/poly(styrenesulfonate) ("PEDOT/PSS"), which is commercially available from H.C. Starck, GmbH (Leverkusen, Germany) under the tradename BAYTRON®-P.

Organic Cations

In one embodiment, the organic cations are salts that are soluble or form dispersions in an aqueous solution with or without a co-solvent, as described herein. The counter ion, or anion, can be one of a number of possible anions that can form a stable salt with the described organic cations, which are, in some embodiments, hydroxides and phosphates. However, the anion is not selected from chloride, bromide, iodide, fluoride, nitrate, perchlorate, or sulfate. Suitable anions include, but are not limited to, carbonate, bicarbonate, acetate, phosphate, hydroxide, tetrafluoroborate, and hexafluorophosphate. Combinations of salts can be used.

In some embodiments, the organic cations are derived from a salt that includes tetraalkyl ammonium phosphate, tetraalkyl ammonium hydroxide, diallyl dimethyl ammonium phosphate, diallyl dimethyl ammonium hydroxide, or mixtures thereof. In some embodiments the organic cation is derived from tetramethyl ammonium hydroxide.

In one embodiment, the organic cation is derived from a phosphate or a hydroxide salt.

The organic cations can be present in a concentration greater than about 0.1 mmol per gram of the conductive polymer, between about 0.1 and 10 mmol per gram of the conductive polymer, or between about 0.5 and 3 mmol per gram of the conductive polymer.

Solvents and Co-Solvents

It is understood that the compositions are in suitable solvents. In one embodiment, the solvent is an aqueous dispersion.

In one embodiment, the compositions further comprise co-solvents that are either ethers, cyclic ethers, alcohols, alcohol ethers, ketones, nitriles, sulfides, sulfoxides, amides, amines, or carboxylic acids, or combinations thereof. In certain embodiments, the co-solvents are alcohols or alcohol ethers, or combinations thereof, e.g., n-propanol or 1-methoxy-2-propanol. In some embodiments, the co-solvents are present in amounts from about 5% by weight to about 60% by weight, based on the total weight of liquid. In other embodiments, the co-solvents are present in amounts of from about 10% by weight to about 30% by weight.

Co-solvents contemplated for use in the new compositions are generally polar, water-miscible organic liquids. Examples of suitable types of co-solvents include, but are not limited to, ethers, cyclic ethers, alcohols, alcohol ethers, ketones, nitriles, sulfides, sulfoxides, amides, amines, carboxylic acids, as well as combinations of any two or more thereof.

Exemplary ether co-solvents contemplated for use in the new compositions include, but are not limited to, diethyl ether, ethyl propyl ether, dipropyl ether, diisopropyl ether, dibutyl ether, methyl t-butyl ether, glyme, diglyme, benzyl methyl ether, isochroman, 2-phenylethyl methyl ether, n-butyl ethyl ether, 1,2-diethoxyethane, sec-butyl ether, diisobutyl ether, ethyl n-propyl ether, ethyl isopropyl ether, n-hexyl methyl ether, n-butyl methyl ether, methyl n-propyl ether, and the like, as well as combinations of any two or more thereof.

Exemplary cyclic ether co-solvents contemplated for use in the new compositions include, but are not limited to, 1,4-dioxane, tetrahydrofuran, tetrahydropyran, 4 methyl-1,3-dioxane, 4-phenyl-1,3-dioxane, 1,3-dioxolane, 2-methyl-1,3-dioxolane, 1,3-dioxane, 2,5-dimethoxytetrahydrofuran, 2,5- dimethoxy-2,5-dihydrofuran, and the like, as well as combinations of any two or more thereof. In one embodiment, the cyclic ether co-solvent is tetrahydrofuran, tetrahydropyran, or 1,4-dioxane.

Exemplary alcohol co-solvents contemplated for use in the new compositions include, but are not limited to, methanol, ethanol, 1-propanol, 2-propanol (i.e., isopropanol), 1-butanol, 2-butanol, 2-methyl-1-propanol (i.e., isobutanol), 2-methyl-2-propanol (i.e., tert-butanol), 1-pentanol, 2-pentanol, 3-pentanol, 2,2-dimethyl-1-propanol, 1-hexanol, cyclopentanol, 3-methyl-1-butanol, 3-methyl-2-butanol, 2-methyl-1-butanol, 2,2-dimethyl-1-propanol, 3-hexanol, 2-hexanol, 4-methyl-2-pentanol, 2-methyl-1-pentanol, 2-ethylbutanol, 2,4-dimethyl-3-pentanol, 3-heptanol, 4-heptanol, 2-heptanol, 1-heptanol, 2-ethyl-1-hexanol, 2,6-dimethyl-4-heptanol, 2-methylcyclohexanol, 3-methylcyclohexanol, 4-methylcyclohexanol, and the like, as well as combinations of any two or more thereof. In one embodiment, the alcohol co-solvent is methanol, ethanol, or isopropanol.

Exemplary alcohol ether co-solvents contemplated for use in the new compositions include, but are not limited to, 2-butoxyethanol, 1-methoxy-2-propanol, 2-methoxyethanol, 2-ethoxyethanol, 1-methoxy-2-butanol, ethylene glycol monoisopropyl ether, 1-ethoxy-2-propanol, 3-methoxy-1-butanol, ethylene glycol monoisobutyl ether, ethylene glycol mono-n-butyl ether, 3-methoxy-3-methylbutanol, ethylene glycol mono-tert-butyl ether, and the like, as well as combinations of any two or more thereof. In one embodiment, the alcohol ether co-solvent is 1-methoxy-2-propanol, 2-methoxyethanol, or 2-butoxyethanol.

Exemplary ketone co-solvents contemplated for use in the new compositions include, but are not limited to, acetone, methylethyl ketone, methyl iso-butyl ketone, cyclohexanone, isopropyl methyl ketone, 2-pentanone, 3-pentanone, 3-hexanone, diisopropyl ketone, 2-hexanone, cyclopentanone, 4-heptanone, iso-amyl methyl ketone, 3-heptanone, 2-heptanone, 4-methoxy-4-methyl-2-pentanone, 5-methyl-3-heptanone, 2-methylcyclohexanone, diisobutyl ketone, 5-methyl-2-octanone, 3-methylcyclohexanone, 2-cyclohexen-1-one, 4-methylcyclohexanone, cycloheptanone, 4-tert-butylcyclohexanone, isophorone, benzyl acetone, and the like, as well as combinations of any two or more thereof.

Exemplary nitrile co-solvents contemplated for use in the new compositions include, but are not limited to, acetonitrile, acrylonitrile, trichloroacetonitrile, propionitrile, pivalonitrile, isobutyronitrile, n-butyronitrile, methoxyacetonitrile, 2-methylbutyronitrile, isovaleronitrile, n-valeronitrile, n-capronitrile, 3-methoxypropionitrile, 3-ethoxypropionitrile, 3,3'-oxydipropionitrile, n-heptanenitrile, glycolonitrile, benzonitrile, ethylene cyanohydrin, succinonitrile, acetone cyanohydrin, 3-n-butoxypropionitrile, and the like, as well as combinations of any two or more thereof.

Exemplary sulfoxide co-solvents contemplated for use in the new compositions include, but are not limited to, dimethyl sulfoxide (DMSO), di-n-butyl sulfoxide, tetramethylene sulfoxide, methyl phenyl sulfoxide, and the like, as well as combinations of any two or more thereof.

Exemplary amide co-solvents contemplated for use in the new compositions include, but are not limited to, dimethyl formamide (DMF), dimethyl acetamide, acylamide, 2-acetamidoethanol, N,N-dimethyl-m-toluamide, trifluoroacetamide, N,N-dimethylacetamide, N,N-diethyldodecanamide, ε-caprolactam, N,N-diethylacetamide, N-tert-butylformamide, formamide, pivalamide, N-butyramide, N,N-dimethylacetoacetamide, N-methyl formamide, N,N-diethylformamide, N-formylethylamine, acetamide, N,N-diisopropylformamide, 1-formylpiperidine, N-methylformanilide, and the like, as well as combinations of any two or more thereof.

Exemplary amine co-solvents contemplated for use in the new compositions include, but are not limited to, mono-, di-, and tri-alkyl amines, cyclic amines (such as, e.g., pyrrolidine), aromatic amines (such as, e.g., pyridine) and the like, as well as combinations of any two or more thereof. In one embodiment, the amine co-solvent is pyridine.

Exemplary carboxylic acid co-solvents contemplated for use in the new compositions include, but are not limited to, $C_1$ up to about $C_6$ straight or branched chain carboxylic acids, as well as combinations of any two or more thereof. In one embodiment, the carboxylic acid co-solvent is formic acid.

In one embodiment, the compositions are used to form a buffer layer.

In one embodiment, methods for ameliorating the wide column gap defect in an organic electronic device are provided, comprising providing a layer in the device comprising the above-described compositions.

In one embodiment, compositions are provided comprising the above-described compounds and at least one solvent, processing aid, charge transporting material, or charge blocking material. These compositions can be in any form, including, but not limited to solvents, emulsions, and colloidal dispersions.

Device

Figure 1:
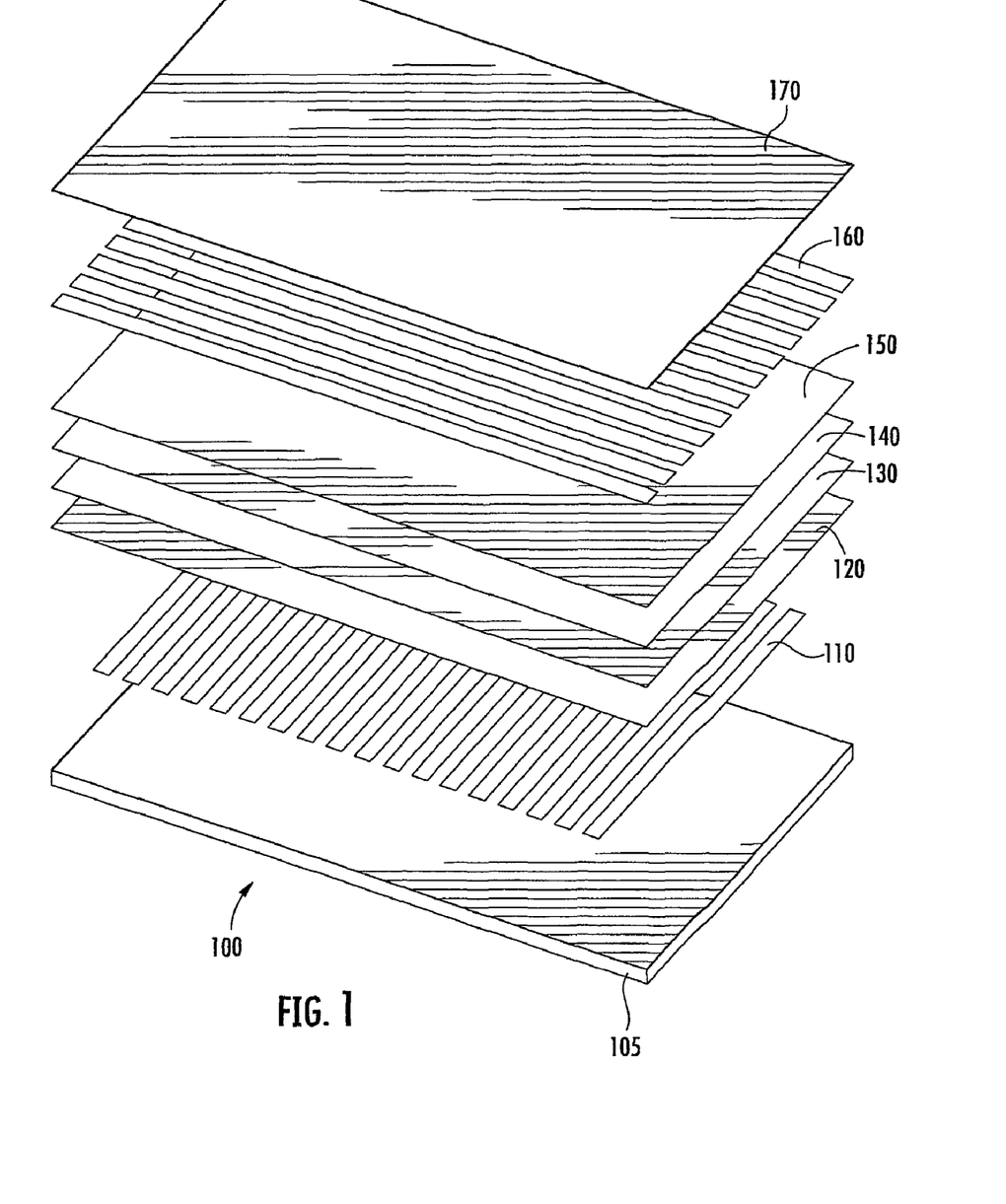
FIG. 1 is a schematic diagram of an organic electronic device.

Referring to FIG. 1, an exemplary organic electronic device 100 is shown. The device 100 includes a substrate 105. The substrate 105 may be rigid or flexible, for example, glass, ceramic, metal, or plastic. When voltage is applied, emitted light is visible through the substrate 105.

A first electrical contact layer 110 is deposited on the substrate 105. For illustrative purposes, the layer 110 is an anode layer. Anode layers may be deposited as lines. The anode can be made of, for example, materials containing or comprising metal, mixed metals, alloy, metal oxides or mixed-metal oxide. The anode may comprise a conducting polymer, polymer blend or polymer mixtures. Suitable metals include the Group 11 metals, the metals in Groups 4, 5, and 6, and the Group 8, 10 transition metals. If the anode is to be light-transmitting, mixed-metal oxides of Groups 12, 13 and 14 metals, such as indium-tin-oxide, are generally used. The anode may also comprise an organic material, especially a conducting polymer such as polyaniline, including exemplary materials as described in *Flexible Light-Emitting Diodes Made From Soluble Conducting Polymer, Nature* 1992, 357, 477-479. At least one of the anode and cathode should be at least partially transparent to allow the generated light to be observed.

An optional buffer layer 120, such as hole transport materials, may be deposited over the anode layer 110, the latter being sometimes referred to as the "hole-injecting contact layer." Examples of hole transport materials suitable for use as the layer 120 have been summarized, for example, in Kirk Othmer, Encyclopedia of Chemical Technology, Vol. 18, 837-860 (4$^{th}$ ed. 1996). Both hole transporting "small" molecules as well as oligomers and polymers may be used. Hole transporting molecules include, but are not limited to: N,N' diphenyl-N,N'-bis(3-methylphenyl)-[1,1'-biphenyl]-4,4'-diamine (TPD), 1,1 bis[(di-4-tolylamino) phenyl]cyclohexane (TAPC), N,N' bis(4-methylphenyl)-N,N'-bis(4-ethylphenyl)-[1,1'-(3,3'-dimethyl)biphenyl]-4,4'-diamine (ETPD), tetrakis (3-methylphenyl)-N,N,N',N'-2,5-phenylenediamine (PDA), a-phenyl 4-N,N-diphenylaminostyrene (TPS), p(diethylamino)benzaldehyde diphenylhydrazone (DEH), triphenylamine (TPA), bis[4 (N,N-diethylamino)-2-methylphenyl](4-methylphenyl)methane (MPMP), 1 phenyl-3-[p-(diethylamino)styryl]-5-[p-(diethylamino)phenyl]pyrazoline (PPR or DEASP), 1,2 trans-bis(9H-carbazol-9-yl)cyclobutane (DCZB), N,N,N',N' tetrakis(4-methylphenyl)-(1,1'-biphenyl)-4,4'-diamine (TTB), and porphyrinic compounds, such as copper phthalocyanine. Useful hole transporting polymers include, but are not limited to, polyvinylcarbazole, (phenylmethyl)polysilane, and polyaniline. Conducting polymers are useful as a class. It is also possible to obtain hole transporting polymers by doping hole transporting moieties, such as those mentioned above, into polymers such as polystyrenes and polycarbonates.

An organic layer 130 may be deposited over the buffer layer 120 when present, or over the first electrical contact layer 110. In some embodiments, the organic layer 130 may be a number of discrete layers comprising a variety of components. Depending upon the application of the device, the organic layer 130 can be a light-emitting layer that is activated by an applied voltage (such as in a light-emitting diode or light-emitting electrochemical cell), or a layer of material that responds to radiant energy and generates a signal with or without an applied bias voltage (such as in a photodetector).

Other layers in the device can be made of any materials which are known to be useful in such layers upon consideration of the function to be served by such layers.

Any organic electroluminescent ("EL") material can be used as a photoactive material (e.g., in layer 130). Such materials include, but are not limited to, fluorescent dyes, small molecule organic fluorescent compounds, fluorescent and phosphorescent metal complexes, conjugated polymers, and mixtures thereof. Examples of fluorescent dyes include, but are not limited to, pyrene, perylene, rubrene, derivatives thereof, and mixtures thereof. Examples of metal complexes include, but are not limited to, metal chelated oxinoid compounds, such as tris(8-hydroxyquinolato)aluminum (Alq3); cyclometalated iridium and platinum electroluminescent compounds, such as complexes of Iridium with phenylpyridine, phenylquinoline, or phenylpyrimidine ligands as disclosed in Petrov et al., Published PCT Application WO 02/02714, and organometallic complexes described in, for example, published applications US 2001/0019782, EP 1191612, WO 02/15645, and EP 1191614; and mixtures thereof. Electroluminescent emissive layers comprising a charge carrying host material and a metal complex have been described by Thompson et al., in U.S. Pat. No. 6,303,238, and by Burrows and Thompson in published PCT applications WO 00/70655 and WO 01/41512. Examples of conjugated polymers include, but are not limited to poly(phenylenevinylenes), polyfluorenes, poly(spirobifluorenes), polythiophenes, poly(p-phenylenes), copolymers thereof, and mixtures thereof.

In one embodiment of the devices of the invention, photoactive material can be an organometallic complex. In another embodiment, the photoactive material is a cyclometalated complex of iridium or platinum. Other useful photoactive materials may be employed as well. Complexes of iridium with phenylpyridine, phenylquinoline, or phenylpyrimidine ligands have been disclosed as electroluminescent compounds in Petrov et al., Published PCT Application WO 02/02714. Other organometallic complexes have been described in, for example, published applications US 2001/0019782, EP 1191612, WO 02/15645, and EP 1191614. Electroluminescent devices with an active layer of polyvinyl carbazole (PVK) doped with metallic complexes of iridium have been described by Burrows and Thompson in published PCT applications WO 00/70655 and WO 01/41512. Electroluminescent emissive layers comprising a charge carrying host material and a phosphorescent platinum complex have been described by Thompson et al., in U.S. Pat. No. 6,303,238, Bradley et al., in Synth. Met. 2001, 116 (1-3), 379-383, and Campbell et al., in Phys. Rev. B, Vol. 65 085210.

A second electrical contact layer 160 is deposited on the organic layer 130. For illustrative purposes, the layer 160 is a cathode layer.

Cathode layers may be deposited as lines or as a film. The cathode can be any metal or nonmetal having a lower work function than the anode. Exemplary materials for the cathode can include alkali metals, especially lithium, the Group 2 (alkaline earth) metals, the Group 12 metals, including the rare earth elements and lanthanides, and the actinides. Materials such as aluminum, indium, calcium, barium, samarium and magnesium, as well as combinations, can be used. Lithium-containing and other compounds, such as LiF and $Li_2O$, may also be deposited between an organic layer and the cathode layer to lower the operating voltage of the system.

An electron transport layer 140 or electron injection layer 150 is optionally disposed adjacent to the cathode, the cathode being sometimes referred to as the "electron-injecting contact layer."

An encapsulation layer 170 is deposited over the contact layer 160 to prevent entry of undesirable components, such as water and oxygen, into the device 100. Such components can have a deleterious effect on the organic layer 130. In one embodiment, the encapsulation layer 170 is a barrier layer or film.

Though not depicted, it is understood that the device 100 may comprise additional layers. For example, there can be a layer (not shown) between the anode 110 and hole transport layer 120 to facilitate positive charge transport and/or bandgap matching of the layers, or to function as a protective layer. Other layers that are known in the art or otherwise may be used. In addition, any of the above-described layers may comprise two or more sub-layers or may form a laminar structure. Alternatively, some or all of anode layer 110 the hole transport layer 120, the electron transport layers 140 and 150, cathode layer 160, and other layers may be treated, especially surface treated, to increase charge carrier transport efficiency or other physical properties of the devices. The choice of materials for each of the component layers is preferably determined by balancing the goals of providing a device with high device efficiency with device operational lifetime considerations, fabrication time and complexity factors and other considerations appreciated by persons skilled in the art. It will be appreciated that determining optimal components, component configurations, and compositional identities would be routine to those of ordinary skill of in the art.

In one embodiment, the different layers have the following range of thicknesses: anode 110, 500-5000 Å, in one embodiment 1000-2000 Å; hole transport layer 120, 50-2000 Å, in one embodiment 200-1000 Å; photoactive layer 130, 10-2000 Å, in one embodiment 100-1000 Å; layers 140 and 150, 50-2000 Å, in one embodiment 100-1000 Å; cathode 160, 200-10000 Å, in one embodiment 300-5000 Å. The location of the electron-hole recombination zone in the device, and thus the emission spectrum of the device, can be affected by the relative thickness of each layer. Thus the thickness of the electron-transport layer should be chosen so that the electron-hole recombination zone is in the light-emitting layer. The desired ratio of layer thicknesses will depend on the exact nature of the materials used.

In operation, a voltage from an appropriate power supply (not depicted) is applied to the device 100. Current therefore passes across the layers of the device 100. Electrons enter the organic polymer layer, releasing photons. In some OLEDs, called active matrix OLED displays, individual deposits of photoactive organic films may be independently excited by the passage of current, leading to individual pixels of light emission. In some OLEDs, called passive matrix OLED displays, deposits of photoactive organic films may be excited by rows and columns of electrical contact layers.

Devices can be prepared employing a variety of techniques. These include, by way of non-limiting exemplification, vapor deposition techniques and liquid deposition. Devices may also be sub-assembled into separate articles of manufacture that can then be combined to form the device.

DEFINITIONS

The use of "a" or "an" are employed to describe elements and components of the invention. This is done merely for convenience and to give a general sense of the invention. This description should be read to include one or at least one and the singular also includes the plural unless it is obvious that it is meant otherwise.

The term "active" when referring to a layer or material is intended to mean a layer or material that exhibits electronic or electro-radiative properties. An active layer material may emit radiation or exhibit a change in concentration of electron-hole pairs when receiving radiation. Thus, the term "active material" refers to a material which electronically facilitates the operation of the device. Examples of active materials include, but are not limited to, materials which conduct, inject, transport, or block a charge, where the charge can be either an electron or a hole. Examples of inactive materials include, but are not limited to, planarization materials, insulating materials, and environmental barrier materials.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "layer" is used interchangeably with the term "film" and refers to a coating covering a desired area. The area can be as large as an entire device or a specific functional area such as the actual visual display, or as small as a single sub-pixel. Films can be formed by any conventional deposition technique, including vapor deposition and liquid deposition. Liquid deposition techniques include, but are not limited to, continuous deposition techniques such as spin coating, gravure coating, curtain coating, dip coating, slot-die coating, spray-coating, and continuous nozzle coating; and discontinuous deposition techniques such as ink jet printing, gravure printing, and screen printing.

The term "organic electronic device" is intended to mean a device including one or more semiconductor layers or materials. Organic electronic devices include, but are not limited to: (1) devices that convert electrical energy into radiation (e.g., a light-emitting diode, light emitting diode display, diode laser, or lighting panel), (2) devices that detect signals through electronic processes (e.g., photodetectors photoconductive cells, photoresistors, photoswitches, phototransistors, phototubes, infrared ("IR") detectors, or biosensors), (3) devices that convert radiation into electrical energy (e.g., a photovoltaic device or solar cell), and (4) devices that include one or more electronic components that include one or more organic semiconductor layers (e.g., a transistor or diode). The term device also includes coating materials for memory storage devices, antistatic films, biosensors, electrochromic devices, solid electrolyte capacitors, energy storage devices such as a rechargeable battery, and electromagnetic shielding applications.

The term "substrate" is intended to mean a workpiece that can be either rigid or flexible and may include one or more layers of one or more materials, which can include, but are not limited to, glass, polymer, metal, or ceramic materials, or combinations thereof.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic, and semiconductive member arts.

EXAMPLES

The concepts described herein will be further described in the following examples, which do not limit the scope of the invention described in the claims.

Example 1 a. PEDOT/PSS and Wide Column Gap (WCG) Defects

BAYTRON-P® CH8000, in commercially available form, was used as a buffer layer. The BAYTRON-P® CH8000 is a Poly(3,4-ethylenedioxythiophene)/poly(styrenesulfonate) (PEDOT/PSS) dispersion with a pH below 2 and contains 0.4 mmoles sodium ion per gram of dried polymer. It has a sulfate content less than 10 ppm.

Devices were fabricated and tested according to the general test procedure described below. The defect is evaluated and given a "WCG Severity Rating" on a scale of 0 to 5, where 0 indicated no defect and 5 indicated a severe defect. The effect of applying reverse bias current on formation of wide column gap defect from BAYTRON-P® CH8000 is shown in TABLE 1.

TABLE 1

| Buffer Layer Component | Current between 2 anode columns at start, µA | Current between 2 anode columns at finish, µA | WCG Severity Rating |
|---|---|---|---|
| BAYTRON-P ® CH8000 | 6 | 2 | 5 |

It can be seen that a device having a buffer layer made from the BAYTRON-P® CH8000 with a sodium level of 0.4 mmoles per gram of dried polymer shows a serious wide column gap defect.

b. Removal of Sodium Cation in BAYTRON-P and its Effect on WCG Defects

Devices were fabricated and tested according to the general test procedure described below. The buffer layer was either PEDOT/PSS, commercially available BAYTRON-P® CH8000 (see above), or deionized PEDOT/PSS, purchased from H. C. Starck as deionized BAYTRON-P® CH8000. The effect of applying reverse bias current on formation of wide column gap defect is shown in TABLE 2.

TABLE 2

| Buffer Layer Composition | Approx. Cation Concentration [mmol/g of dried polymer] | Test Conditions | WCG Severity Ranking |
|---|---|---|---|
| PEDOT/PSS | 0.4 Na+ | 14 V for 60 min. | 4 |
| deionized PEDOT/PSS | <0.001 Na+ | 14 V for 60 min. | 5 |

The results revealed that the WCG defect was more severe when a deionized PEDOT dispersion was used, where sodium was mostly removed.

General Test Method

The wide column experiment was performed as follows. An electrical schematic of a wide column defect experiment is given in the scheme below:

Glass/ITO substrates having an ITO thickness of about 100 nm to 150 nm was used. The ITO was patterned into parallel lines about 370 μm wide, which were spaced about 50 μm apart. The ITO line plates were then spin-coated with a photoresist and subsequently patterned into mushroom-shaped lines perpendicular to the ITO lines. Adjacent mushroom lines were spaced 370 μm apart; thereby forming pixels having the dimension of 370 μm×370 μm. The substrates with patterned ITO and mushroom lines were cleaned and subsequently treated with UV ozone. The buffer layer was spin-coated onto the ITO/mushroom/glass substrates to a thickness of about 200 nm. The spin-coated films were then baked at 90° C. in vacuum for 30 minutes.

For the light-emitting layer, a 1% (w/v) toluene solution of a polyphenylene vinylene polymer (Super Yellow from Covion, Frankfurt, Germany) was spin-coated on top of the dried buffer layer and subsequently baked at 130° C. in nitrogen for 30 minutes, having a final thickness of about 70 nm. Immediately thereafter, a 3.0 nm thick barium layer and 350 nm thick aluminum layer were deposited on the emitter layer to serve as a cathode. The mushroom lines are formed to prevent cathodes from joining together. A glass cover was placed over the device to protect it from oxygen and moisture.

A forward bias of 3.5 volts was applied across all the device cathodes and anodes, and a photograph was taken. This serves as the "base photograph."

The forward bias across the device was turned off and +14 Volts DC (Direct Current) electrical bias was applied to the first anode column visible in the base photograph, while the second anode column, adjacent to the first anode column and also visible in the base photograph, was connected to the electrical ground. The remainder of the cathodes and anodes were left electrically floating. The electrical bias between the two anode columns was maintained on for 64 hours and the electrical current between the 2 columns was recorded at the start and at the finish of applying the bias. The electrical bias between the two anode columns was then removed and immediately after, a forward bias of 3.5 volts was applied across all the device cathodes and anodes. At this point, the "final photograph" was taken.

The base and final photographs were visually compared to determine the magnitude of the "wide column gap defect" or "WCG defect." The defect is evaluated and given a "WCG Severity Rating" on a scale of 0 to 5, where 0 indicated no defect and 5 indicated a severe defect.

Example 2

Effect of the pH of BAYTRON-P® AI4083

BAYTRON-P® AI4083 (Lot# CHDSPS0006; solid: 1.48%, pH=1.8), in the amount of 80 g, was added with 4 g each of Lewatit® S100 and Lewatit®MP 62 WS for 20 minutes, and 7.70 g of Lewatit® MP62 WS. Lewatit® S100 is the trade name for sodium sulfonate of crosslinked polystyrene (Bayer, Pittsburgh, Pa.), and Lewatit® MP62 WS is the trade name for free base/chloride of tertiary/quaternary amine of crosslinked polystyrene (Bayer, Pittsburgh, Pa.).

The two resins were washed first before use with deionized water, separately, until there was no color in the water. The resins were removed by filtration using VWR #417 filter paper (40 μm). The pH was measured to be 2.2, and was adjusted to 3.95 by the addition of 1.0 M NaOH aqueous solution. Half of the sample was designated as Sample 2a. The other half was further adjusted with 1.0 M NaOH solution to a pH of 7. This sample was designated as Sample 2b.

Samples 2a and 2b and AI4083 were then tested for device performance. Each was spun on glass/ITO backlight substrates (30 mm×30 mm) and baked. The substrate had an ITO thickness from 100 nm to 150 nm and an ITO area of 15 mm×20 mm for light emission. The thickness of the buffer layer is given in TABLE 3, below.

For the light-emitting layer, a 1% (w/v) toluene solution of Lumination Green from Dow Chemicals (Midland, Mich.) was spin-coated on top of the buffer layer films and subsequently baked. The final thickness was 740 Å. A 3 nm thick barium layer and a 300-500 nm aluminum layer deposited on the light emitting layer serves as a cathode. The device data at 1,000 cd/m2 and 25° C. is summarized in Table 3.

TABLE 3

| Buffer | Efficiency (cd/A) | Voltage (V) | Buffer Thickness (Å) |
|---|---|---|---|
| AI4083 (pH 1.8) | 3.8 | 3.7 | 815 |
| Sample 2a (pH 4) | 0.2 | 4.5 | 932 |
| Sample 2b (pH 7) | 0.1 | 4.6 | 855 |

TABLE 3 shows that BAYTRON-P® AI4083 has a much higher voltage and much lower efficiency when the pH is increased from 1.8 to 4, or 7. Thus, BAYTRON-P® A14083 starts to lose effectiveness as a buffer layer when adjusted to a pH greater than approximately 2.

Example 3

Addition of Tetramethyl-Ammonium Hydroxide (TMAH) to BAYTRON-P and its Effect on pH, Particle Size and Conductivity Composition 1-2.05 g of 1.0 M TMAH (Aldrich, Cat. #426318) was added slowly to 40.07 g BAYTRON-P® CH8000 (Lot #BPSS0007, 2.85% solid). This dispersion was stirred for one hour.

Another portion of BAYTRON-P® CH8000 (Lot #BPSS0007, 2.85% solid) was used as a control.

A portion of Composition 1 was kept and co-solvents were added, as shown in Example 6.

The control and Composition 1 dispersions were measured for pH, electrical conductivity of dried films, and particle size counts using an AccuSizer Model 780A (Particle Sizing Systems, Santa Barbara, Calif.). Particle size count is based on the number of particles in one mL of dispersion.

TRON-P® CH8000 (Lot #BPSS0007, 2.85% solid). This dispersion was stirred for one hour.

Composition 2—A second concentration of 2.1 mM TMAH was made by adding 9.5805 g of 1M TMAH slowly to 150.017 g of BAYTRON-P® CH8000, which was stirred for one hour.

Backlight device fabrication and device tests are described below. Glass/ITO substrates having an ITO thickness of about 100 nm to 150 nm were used. The ITO was patterned into parallel lines about 370 μm wide, which were spaced about 50 μm apart. The ITO line plates were then spin-coated with a photo-resist and subsequently patterned into mushroom-shaped lines perpendicular to the ITO lines. Adjacent mushroom lines were spaced 370 μm apart, thereby forming pixels having the dimension of 370 μm×370 μm. The substrates with patterned ITO and mushroom lines were cleaned.

The buffer layer was spin-coated onto the ITO/mushroom/glass substrates to a thickness of about 200 nm. The spin-coated films were baked. For the light-emitting layer, a 1% (w/v) toluene solution of a polyphenylene vinylene polymer (Super Yellow from Covion, Frankfurt, Germany) was spin-coated on top of the dried buffer layer and subsequently baked, with a final thickness of about 70 nm.

A 1.0 nm to 2.0 nm thick barium layer and a 300 nm to 500 nm thick aluminum layer were deposited on the emitter layer to serve as a cathode, and the device encapsulated.

All standard backlight (B/L) visual and electrical measurements were done after the standard burn-in (10 cycles between −17V to 5 V, followed by 1 hour at 5V, 70° C.). Data collected include efficiency (cd/A) at 200 nits, drive voltage to achieve 200 nits (V volts), and leakage current (μA) at 7V reverse bias. Stress life tests were done 70° C. at a current density level corresponding to 200 cd/A.

TABLE 4

| Buffer composition | Approx. Cation Conc. [mmol/g of dried polymer] | pH | Particle size count | | | Conductivity (S/cm) |
|---|---|---|---|---|---|---|
| | | | ≧0.75 μm | # ≧ 1.51 μm | # ≧ 2.46 μm | |
| Control | 0.4 Na⁺ | 1.21 | 20,803 | 1,651 | 573 | $2.7(\pm 0.3) \times 10^{-6}$ |
| Composition 1 | 0.4 Na⁺ and 1.7 TMA⁺ | 1.45 | 19,107 | 2,150 | 772 | $1.3(\pm 01) \times 10^{-6}$ |

The data shows that pH still remains below 2 and electrical conductivity only drops to 50% with addition of TMAH. Particle size count also remains unchanged, even upon taking into account the dilution of the dispersion.

Example 4

Addition of TMAH to BAYTRON-P and its Effect on Backlight Device Performance

Equivalent to Composition 1—7.6812 g of 1.0 M TMAH (Aldrich, Cat. #426318) was added slowly to 150.03 g BAY-

TABLE 5

| Buffer layer | Efficiency (cd/a) | Voltage for 200 cd/m2 | Leakage Current (μA) | Stress Life (hrs to 50% original) |
|---|---|---|---|---|
| Control | 7.5 | 3.7 | 115 | 300 |
| Composition 1 | 8 | 3.7 | 210 | 283 |
| Composition 2 | 8 | 3.5 | 175 | 275 |

The data summarized in Table 5, below, shows that TMAH added to BAYTRON-P has essentially maintained original device performance.

Example 5

Effect of Additive Concentration of TMA Cation on the WCG Defect

Control, Composition 1, and Composition 2 were prepared and used as buffer layers in fabricated backlight devices, as described above. They were tested for wide column defect described in the WCG test method of Example 1.

TABLE 6

| Buffer Composition | Approx. Cation Conc. [mmol/g of dried polymer] | Test Conditions | WCG Severity Ranking |
|---|---|---|---|
| Control | 0.4 Na$^+$ | 14 V for 60 hours | 4 |
| Composition 1 | 0.4 Na$^+$ + 1.7 TMA$^+$ | 14 V for 60 hours | 1 |
| Composition 2 | 0.4 Na$^+$ + 2.1 TMA$^+$ | 14 V for 60 hours | 1 |

The WCG severity ranking summarized in Table 6, above, clearly shows that TMA cation concentrations as low as 1.7 mmole have resulted in a device more resistant to WCG defect.

Example 6

Effect of Co-Solvents on pH, Particle Size and Conductivity of BAYTRON-P and TMAH-Added BAYTRON-P Aqueous dispersions of electrically conducting polymers, which typically have a high surface energy of 73 milli-Newton/meter, frequently form thin layers with coating lacking homogeneity when spin-coated on an indium/tin oxide surface. For example, such films can have coating defects, such as streaks, speed boats, mottles and/or bubbles. For example, BAYTRON-P® CH8000 (Lot #BPSS007, 2.85% solid) has surface tension of 72.6 milli-Newton/meter, which is considered high. This level can cause a lack of homogeneity of a coating on a complex device structure surface.

n-propanol (nPA) or 1-methoxy-2-propanol (1M2P) can be employed to lower the surface tension to approximately 40 milli-Newton/meter.

Table 7 summarizes the effect of nPA/1M2P co-solvents on the properties of PEDOT/PSS dispersion. Control was made as follows: 20.50 g BAYTRON-P (lot #BPSS0007) were added with 2.18 g nPA and 3.75 g 1M2P. The composition constitutes 75 v/v % BAYTRON-P/10 v/v % nPA/15 v/v % 1M2P.

Composition 1 was made as follows: 21.26 g 1.7 mmoles TMA/0.4 mmoles Na BAYTRON-P made in Example 3, 2.26 g nPA, and 3.89 g 1M2P were added together. The composition constitutes 75 v/v % modified BAYTRON-P/10 v/v % nPA/15 v/v % 1M2P.

TABLE 7

| Buffer composition | Approx. Cation Conc. [mmol/g of dried polymer] | pH | Particle size count | | | Conductivity (S/cm) |
|---|---|---|---|---|---|---|
| | | | # ≧ 0.75 μm | # ≧ 1.51 μm | # ≧ 2.46 μm | |
| Control and Co-solvents | 0.4 Na$^+$ | 1.6 | 20,884 | 3,899 | 1,647 | 4.4(±0.2) × 10$^{-6}$ |
| Composition 1 and Co-solvents | 0.4 Na$^+$/1.7 TMA$^+$ | 1.6 | 22,168 | 4,566 | 1,953 | 3.5(±0.1) × 10$^{-6}$ |

The data shows that co-solvents in combination with TMA cation do not affect pH, particle size count, and electrical conductivity.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Many aspects and embodiments have been described above and are merely exemplary and not limiting. After reading this specification, skilled artisans appreciate that other aspects and embodiments are possible without departing from the scope of the invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

The invention claimed is:

1. A method for ameliorating the wide column gap defect in an organic electronic device, comprising:
   providing a layer in the device formed from a composition comprising a dispersion of:
      at least one conductive polymer;
      a water soluble polymeric acid; and an organic cation derived from a phosphate or hydroxide salt wherein the organic cation is present in a concentration between about 0.1 and 10 mmol per gram of the conductive polymer; and wherein the composition has a pH of less than 2.

2. The method of claim 1, wherein the conductive polymer is polythiophene, polypyrrole, polyaniline, polyamine, polyacetylene, poly(thienothiophene), or poly(3,4-ethylenedioxythiophene), or mixtures thereof and the water soluble polymeric acid is poly(styrenesulfonic acid).

3. The method of claim 1, wherein the conductive polymer is poly(3,4-ethylenedioxythiophene).

4. The method of claim 1, wherein the organic cation is derived from a salt comprising tetraalkyl ammonium phosphate, tetraalkyl ammonium hydroxide, diallyl dimethyl ammonium phosphate, diallyl dimethyl ammonium hydroxide, or mixtures thereof.

5. The method of claim 1, wherein the organic cation is derived from tetraalkyl ammonium hydroxide or tetramethyl ammonium hydroxide.

6. The method of claim 1, wherein the water soluble polymeric acid is poly(styrenesulfonic acid).

7. The method of claim 1, further comprising a co-solvent that is an ether, cyclic ether, alcohol, alcohol ether, ketone, nitrile, sulfide, sulfoxide, amide, amine, or carboxylic acid, or mixtures thereof.

8. The method of claim 7, wherein the co-solvent is n-propanol, 1-methoxy-2-propanol, or mixtures thereof.

9. The method of claim 1, wherein the organic cation is present in a concentration between about 0.5 and 3 mmol per gram of the conductive polymer.

10. An organic electronic device having an active layer formed from a composition comprising a dispersion of:
    at least one conductive polymer;
    a water soluble polymeric acid; and
    an organic cation derived from a salt comprising tetraalkyl ammonium phosphate, tetraalkyl ammonium hydroxide, diallyl dimethyl ammonium phosphate, diallyl dimethyl ammonium hydroxide, or mixtures thereof wherein the organic cation is present in a concentration between about 0.1 and 10 mmol per gram of the conductive polymer; and wherein the composition has a pH of less than 2.

11. An article useful in the manufacture of an organic electronic device, said article formed from a composition comprising a dispersion of:
    at least one conductive polymer;
    a water soluble polymeric acid; and
    an organic cation derived from a salt comprising tetraalkyl ammonium phosphate, tetraalkyl ammonium hydroxide, diallyl dimethyl ammonium phosphate, diallyl dimethyl ammonium hydroxide, or mixtures thereof wherein the organic cation is present in a concentration between about 0.1 and 10 mmol per gram of the conductive polymer; and wherein the composition has a pH of less than 2.

12. An organic electronic device having an active layer formed from a composition comprising a dispersion of:
    at least one conductive polymer;
    a water soluble polymeric acid; and
    an organic cation derived from a phosphate or hydroxide salt wherein the organic cation is present in a concentration between about 0.1 and 10 mmol per gram of the conductive polymer; and wherein the composition has a pH of less than 2.

13. An article useful in the manufacture of an organic electronic device, said article formed from a composition comprising a dispersion of:
    at least one conductive polymer;
    a water soluble polymeric acid; and
    an organic cation derived from a phosphate or hydroxide salt wherein the organic cation is present in a concentration between about 0.1 and 10 mmol per gram of the conductive polymer; and wherein the composition has a pH of less than 2.

* * * * *